June 1, 1954   R. S. CLEGG ET AL   2,680,143
METHOD OF SUPPLYING CURRENT TO CONTINUOUS ELECTRODES
Filed April 17, 1952
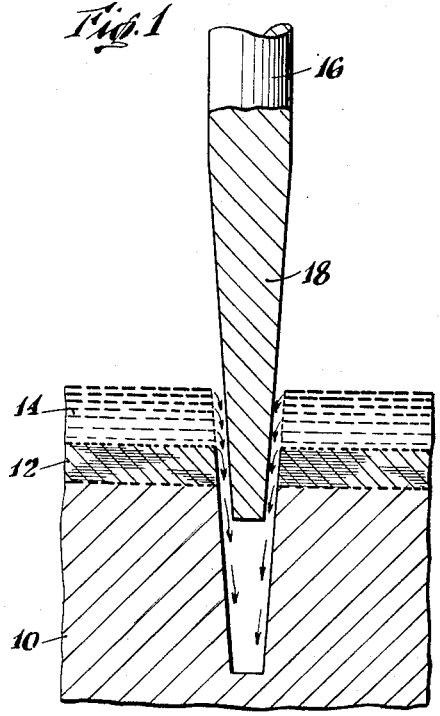
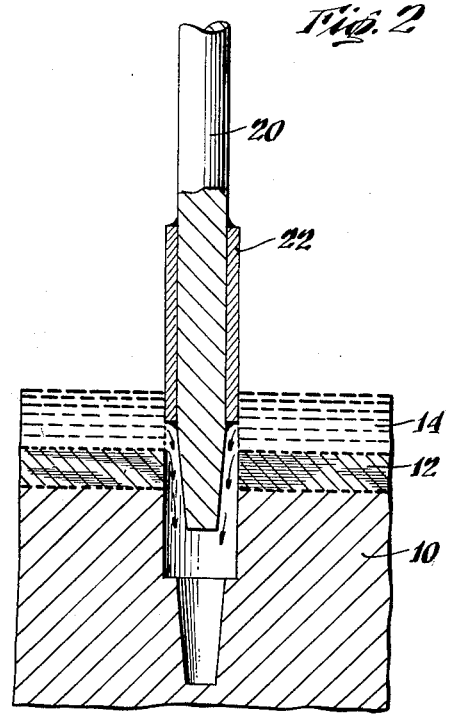
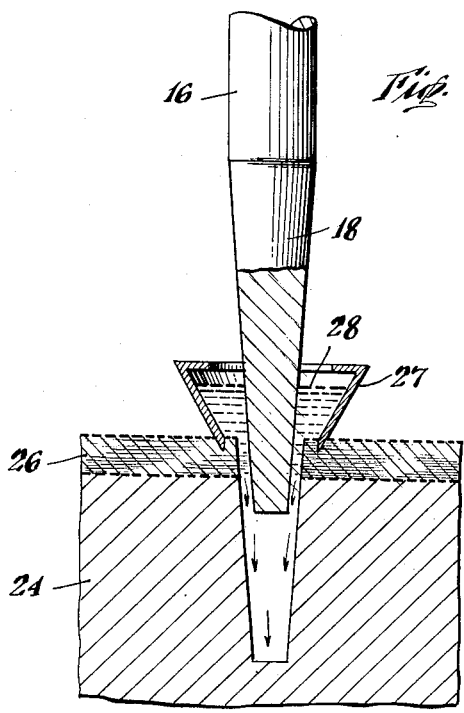
INVENTORS
Robert Stanley Clegg
Peter Campbell Macpherson
BY
Eyre, Mann & Burrows
ATTORNEYS Patented June 1, 1954

2,680,143

UNITED STATES PATENT OFFICE 2,680,143

METHOD OF SUPPLYING CURRENT TO CONTINUOUS ELECTRODES

Robert Stanley Clegg, St. Ola, Fort William, and Peter Campbell Macpherson, Inverlochy, Fort William, Scotland, assignors to Elektrokemisk A/S, Oslo, Norway, a corporation of Norway Application April 17, 1952, Serial No. 282,782

Claims priority, application Norway April 20, 1951

5 Claims. (Cl. 13—18)

This invention relates to a system of handling so-called vertical studs or contact rods in Soederberg-type electrodes such as are employed, for example, in aluminum furnaces. These rods are baked into the electrode mass and serve both to support it and to transmit electric current to it. From time to time the contact rods must be raised and removed from the electrode before their lower ends contact the cryolite bath in the furnace. For this reason the rods are ordinarily arranged in different series so that some can remain fixed in the electrode mass while others are being raised.

In the process of handling such electrodes heretofore employed, the contact rods to be raised are withdrawn from the electrode and a limited amount of so-called electrode paste is inserted in the hole. The rod is then returned to the hole while still hot and pushed or permitted to settle down until its lower end is below the top level of incandescence of the electrode mass. This insures prompt baking of the new paste so that good electrical conductivity is established very quickly. This system and the general arrangement of contact rods is described, for example, in United States Patent No. 2,475,452, issued July 5, 1949.

While the system described has proved to possess many advantages and has gone into extensive use in the industry, it has the drawback that the contact rods or studs must be totally removed from the electrode mass when they are to be raised to a higher position. When this is done, the hole in the electrode serves as a vent for releasing tar fumes from the upper part of the baking electrode mass as well as from the new paste inserted in the holes. The aggregate of these fumes in a large plant where a number of pots are operated, is sufficiently disagreeable to constitute a very real problem. Attempts have been made to collect these fumes and conduct them from the pots, but this is difficult to do.

We have now found that by shaping contact rods or studs so that they have a proper taper or reduction in size toward their lower end, the rods can be partly withdrawn and leave a sufficient space between the rods and the sides of the hole so that liquid paste on the upper part of the electrode will flow down into the space below the raised rod.

We have found that in order to have a proper flow of paste the spaces between the side of the rod and the remaining hole must be at least ½ inch and in some instances where a viscous paste is employed, a space of as much as 1½ inches may be required. Since the rod ordinarily will be raised between about 4 inches and 8 inches at a time, this means that the rods must have a quite substantial taper particularly near the lower end. Obviously such taper or reduction in diameter must extend far enough up the rod so that when the rod is raised, the space between the rod and the previously formed hole will enter a zone where the paste is soft enough to flow. Our experience has indicated that this taper or reduction in diameter should extend up for about 10 inches but under some circumstances, the taper or reduction in diameter may be as little as 8 inches or if a continuous taper is employed, it may have any desired length more than 10 inches. If a taper is employed the rod may, for example, have a conicity varying from 1:3 to 1:24, depending upon the consistency of the paste and the distance that the rod is to be raised. The term "conicity" is here used as indicating the degree of taper on the tip of the rod. Thus if the conical portion of the rod has a change of radius equal to one unit (for example one inch) in a distance of three units (three inches), the conical portion of the rod is said to have a conicity of 1:3. In the same way, if the change of radius is equal to one unit in a distance of 24 units it has a conicity of 1:24.

If preferred, the rod may be tapered only at its lower end, say for a distance of 8 to 12 inches, and then surrounded by a sleeve or otherwise formed with an enlargement to give an increased diameter. Such sleeve in the form of a cylinder is preferably welded to the rod. This sleeve will make for sharp reduction in diameter of the rod at its lower end and it may extend upwardly any desired distance preferably far enough so that its upper end will at all times be out of the paste zone.

In using rods of this type the rod may be raised to its desired fixed position and kept in that position until the new paste is baked around it, or if preferred the rod may be raised slightly above its desired fixed position and then may be pushed or allowed to settle down into the soft paste to a slightly lower position. In either event, it is of primary importance that the lower tip of the rod in its new fixed position must extend down into the area of incandescence of the electrode mass. If this is not done, there will be a long delay in establishing proper contact between the rod and the electrode mass and an unduly large number of rods will have to be employed. The level of incandescence is referred to because there is no sharp and definite line between the baked zone and unbaked zone where the paste is fluid since the baking of the paste is a progressive matter as the electrode is lowered into the furnace.

Actually, and in some cases where the new paste is added to the furnace soon after the rods are raised to their new position, enough heat may be conducted upward by the rods so that all of the paste surrounding the rods will be too much baked to flow. This means that particular care must be taken to maintain fluid paste around the upper part of the rods while they are being raised. This can be done either by adding the paste to the charge only a short time before the rods are raised, or hoppers may be formed around the rods and special charges of paste can be put in these hoppers a short time before they are raised so that such paste becomes fluid when the raising takes place.

The manner in which this invention may be employed is illustrated diagrammatically in the accompanying drawings showing sections through portions of electrode masses together with the lower ends of the rods. In these drawings, Fig. 1 is a sectional view showing a rod with a tapered lower end in an electrode having a mass of fluid paste on top; Fig. 2 is a similar view in which the rod is provided with a sleeve or cylinder surrounding it near its lower end and again the electrode mass has a fluid portion on top; Fig. 3 shows a sectional view employing a rod similar to the rod shown in Fig. 1 but in this case the electrode mass has no fluid portion on top and a special funnel-like container is supplied for holding the fluid paste.

In Fig. 1 the baked and incandescent electrode mass is designated by the numeral 10. 12 is an intermediate zone where the paste is too nearly solid to flow but still is not incandescent. 14 indicates the zone where the paste is sufficiently fluid to flow. While these zones are shown as separated by sharp lines, this is only diagrammatic and it is understood that they will merge gradually from one to the other. Here the rod 16 has a lower tapered portion 18 and this is shown in the raised position. The space between the lower portion of the rod and the baked portion of the electrode is great enough so that fluid paste will flow from zone 14 down to fill a gap below the lower end of rod 18. It is to be noted that the lower end of rod 18 is below the top of the incandescent zone so that a firm bond which will be a good electrical conductor will be established promptly.

Fig. 2 is exactly similar to Fig. 1 except that in this case the rod 20 is surrounded by a cylindrical sleeve 22 which is welded to the rod at both top and bottom. The operation of the rod is the same as in Fig. 1.

In Fig. 3 rod 16 is the same as the rod of Fig. 1 but in this case the electrode mass 24 has an upper zone 26 of paste which is above the incandescent zone but too hard to be fluid. Obviously a rod like that of Fig. 2 may alternatively be used in the Fig. 3 arrangement. Here a special removable funnel-like container 27 is supplied when the rod is to be raised, containing fluid paste as indicated at 28. It is to be understood that this paste may be introduced into the container 27 in the form of briquettes or small lumps which will melt under the influence of the hot portion of the rod as soon as it is raised up to the position shown in the drawing. The melted paste will form a seal around the rod and flow down to below the space below it. As before, the lower tip of the rod is positioned below the top of the incandescent portion of the electrode mass.

In each of these cases an operation is shown where the rod is raised to its desired final position. As previously described, the rod may initially be raised to a somewhat higher point and then allowed to settle or be pushed down to the position shown.

The fact that it is not necessary to remove the rods from the electrode mass greatly reduces the labor necessary for raising the rods as occasion demands.

What we claim is:

1. In the operation of an electric furnace including a self-baking electrode mass having a bottom incandescent portion, a portion at the top formed of soft substantially liquid paste and an intermediate portion which is solidified but is below the temperature of incandescence, and metal rods extending into the electrode mass for suspending said electrode and for supplying current thereto, said rods being characterized by the fact that at their lower part they are reduced in diameter and that this reduced part extends high enough up on the rod so that when a rod is raised to the extent hereinafter defined, the reduced diameter portion will extend up into the top liquid paste portion of the electrode mass, the method of repositioning such rods which comprises loosening such a rod in the electrode mass, raising it sufficiently so that soft liquid paste will flow down around the portion of the rod having a reduced diameter and fill the opening below and around the rod without raising it far enough so that the tip of the rod is entirely above the hardened portion of the electrode mass, and while the paste material around such rod is still soft repositioning such rod with its lower tip reaching down below the top of the incandescent portion of the electrode.

2. A method as specified in claim 1 characterized by the fact that said method is carried out using rods which are conical and are tapered with a conicity between 1:3 and 1:24.

3. A method as specified in claim 2 characterized by the fact that said method is carried out using rods having a cylinder welded about each rod, the outside diameter of said cylinder being from 1 to 3 inches larger than the outside diameter of the rod.

4. A method as specified in claim 1 in which the top liquid portion of the electrode paste is held around the rod in a funnel-shaped removable container.

5. In the operation of an electric furnace including a self-baking continuous electrode mass having a bottom incandescent portion, a top portion formed of soft substantially liquid paste and an intermediate portion which is solidified but is below the temperature of incandescence and metal rods extending into the electrode mass for suspending said electrode and for supplying current thereto, the method which comprises using rods which are conical at their lower end with the conical portion extending up on the rod sufficiently so that when the rods are raised to the extent hereinafter defined the portion of reduced diameter will extend up into the liquid portion of the electrode mass, and from time to time repositioning such rods by loosening such a rod in the electrode mass, raising it sufficiently so that soft liquid paste will flow down around the conical portion of the rod and fill the opening below and around the rod without raising it far enough so that the tip of the rod is entirely above the hardened portion of the electrode mass and repositioning such rod with its lower tip below the top of the incandescent portion of the electrode, whereby the paste material around such lower tip of the electrode will harden rapidly to give a good electrical connection between the rod and the incandescent electrode mass.

References Cited in the file of this patent

UNITED STATES PATENTS

| Number | Name | Date |
|---|---|---|
| 1,441,037 | Soderberg | Jan. 2, 1923 |
| 1,757,695 | Westly | May 6, 1930 |
| 2,224,739 | Manfredini | Dec. 10, 1940 |
| 2,475,452 | Jouannet | July 5, 1949 |

FOREIGN PATENTS

| Number | Country | Date |
|---|---|---|
| 526,696 | Great Britain | Sept. 24, 1940 |
| 611,455 | Great Britain | Oct. 29, 1948 |

OTHER REFERENCES

Sem et al., Journal of the Electrochemical Society; vol. 94, No. 5, November 1948 (pp. 220–231).